Jan. 9, 1923. 1,441,289.
E. S. LINCOLN.
CURRENT COLLECTING HEAD.
FILED JAN. 7, 1922.

Inventor
Ellis S. Lincoln

Frank Slusher

By
Attorney

Patented Jan. 9, 1923.

1,441,289

UNITED STATES PATENT OFFICE.

ELLIS S. LINCOLN, OF MANSFIELD, OHIO, ASSIGNOR TO THE OHIO BRASS COMPANY, OF MANSFIELD, OHIO, A CORPORATION OF NEW JERSEY.

CURRENT-COLLECTING HEAD.

Application filed January 7, 1922. Serial No. 527,582.

*To all whom it may concern:*

Be it known that I, ELLIS S. LINCOLN, a citizen of Sweden, residing at Mansfield, in the county of Richland and State of Ohio, have invented certain new and useful Improvements in Current-Collecting Heads, of which the following is a specification.

My invention relates to electric current collecting heads and is especially adapted to the collecting of electric current from a conductor supplying current to a moving vehicle.

My invention has for its object a current collector with improved means for conducting a heavy electric current from one to the other of two relatively moving parts, and resides in the construction, combination and relation of the various parts hereinafter fully described and claimed and shown in the accompanying drawings in which:—

Figure 1:
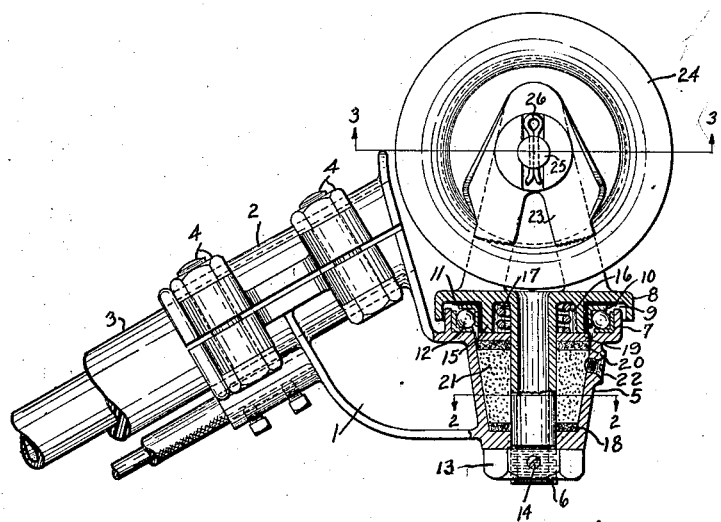
Fig. 1 is a side view in elevation and partial section.
Figure 2:
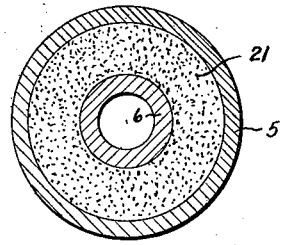
Fig. 2 is a section on the line 2—2 of Fig. 1.
Figure 3:
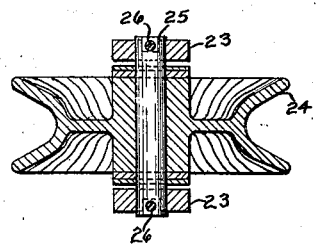
Fig. 3 is a section on the line 3—3 of Fig. 1.

In my preferred form I employ a body member 1 provided with means 2 for attachment to a support 3. The means 2 is made to engage the support 3 by the bolts and nuts 4. Integral with the body is a receptacle 5 which may also be a separate part secured to the body 1. The receptacle 5 is closed at the bottom except for a passage to receive the stem 6, and is provided with tapering side wall and a circular channel to receive a ball race 7 which is preferably of hardened steel. Mounted on the receptacle member 5 is a carriage 8 provided with the stem 6 the axis of which is substantially vertical under normal operating conditions. The carriage 8 is provided with a channel 9 in which is mounted a ball race 10 with an interposed member 11 of insulating material. This insulating member prevents any current passing from the carriage 8 to the body 1 by way of the metal balls 12 located in the ball races and hence avoids any possibility of the balls and races becoming pitted and destroying the antifriction feature. The stem 6 passes through the chamber in the receptacle and the opening in the bottom closure and is provided with a nut 13 on the lower end for holding the parts in place and adjusting the amount of freedom of movement of the parts. The nut 13 is held in the adjusted position by the screw 14. This construction permits freedom of pivotal movement of the parts. The flange 15 forms with the stem 6 a circular channel 16 in which is located a spring 17. In the bottom of the chamber in the receptacle 5 is a washer 18 preferably of yielding material such as felt, leather or rubber, etc., and in the upper part of the chamber and surrounding the stem 6 is a metal washer 19 which is limited in its upper position by the flange 15 but is capable of being moved downward by the spring 17 which exerts a constant downward pressure on the washer 19. Positioned against the underside of the washer 19 is a yielding washer 20 similar to 18. The chamber in the receptacle is filled with a conducting material 21 for electric currents and forms the main electric connection between the members 1 and 8, and this conducting material forms a path for the flow of current of great cross-section and contact area with both the stem 6 and inner walls of the receptacle 5. This conducting material may be of granular or powered carbon or metal, small metallic balls or a conducting liquid such as mercury. The granular or powdered conducting material or metallic balls is yielding in that the particles move upon each other and adjust themselves relative to the adjacent particles, thus increasing and maintaining the highest degree of conductivity and the spring 17 tends to bring about this condition. The conducting material is inserted through the opening normally closed by the screw 22. The receptacle being smaller at the bottom, the conducting material will tend to crowd into closer relation and improve the conducting properties.

Mounted on the carrier 8 are the upright supports 23 with a contactor 24 mounted therebetween by the pin 25 held in position by the cotters 26. The contactor 24 may be of the wheel type as shown or of the well known sliding type.

There are other uses to which my invention may be put and modifications which may be made in my invention from the herein disclosure but I do not wish to be limited other than by my claims as follows:

1. An alining current collector comprising two relative rotatable members, means on one member to secure it to a support and rotatable means mounted on the other member to engage a conductor and a yielding mass of conducting particles interposed between the relative rotatable members.

2. An alining current collector comprising two relative rotatable members, one of the members rotatable about a vertical axis and an interposed conducting material composed of a yielding mass of conducting particles adjustable relative to each other.

3. An alining current collector comprising two relative rotatable members, one of the members rotatable about a substantially vertical axis and an interposed conducting material composed of a plurality of conducting particles adjustable relative to each other.

4. An alining current collector comprising two relative rotatable members, one of the members rotatable about a substantially vertical axis and an interposed conducting material electrically connecting the members and readily adjustable to the shape of the contacting surfaces to be connected.

5. An alining current collector comprising two relative rotatable members, one of the members rotatable about a substantially vertical axis and an interposed conducting material composed of a plurality of conducting particles adjustable relative to each other.

6. An alining current collector comprising two relative rotatable members, one of the members rotatable about a substantially vertical axis and the other member having sides tapered relative to the first member, and an interposed conducting material composed of a plurality of conducting particles contacting with and adjustable relative to each other.

7. An alining current collector comprising two relative rotatable members, one of the members rotatable about a substantially vertical axis and the other member having sides tapered relative to the first member, and an interposed conducting material electrically connecting the members and capable of conforming to the shape of the contacting surfaces to be connected.

8. A current collecting device comprising a body member provided with a receptacle, a member mounted on the body member and rotatable relative thereto about a vertical axis and provided with means to engage a source of electrical supply and conducting material reposing in the receptacle and engaging the last named member to electrically connect the members.

9. A current collecting device comprising a body member provided with a receptacle, a member mounted on the body member and rotatable relative thereto about a vertical axis and provided with means to engage a source of electrical supply and having means extending into the receptacle and conducting material reposing in the receptacle and comprising a plurality of adjustable conducting particles engaging with the said members to electrically connect them.

10. A current collecting device comprising two relatively rotatable parts, one part provided with a receptacle and the other part provided with means to engage a conductor, conducting material composed of conducting particles reposing in the receptacle of the one part and engaging the other part and means acting on the conducting material to maintain the particles in contact with adjacent particles and in engagement with the movable parts.

11. A current collecting device comprising two relatively rotatable parts, one part provided with the receptacle and the other part provided with means to engage the conductor, conducting material composed of conducting particles reposing in the receptacle of the one part and engaging the other part and resilient means acting on the conducting material to maintain the particles in contact with adjacent particles and in engagement with the movable parts.

12. A current collecting device comprising two relatively rotatable members and an interposed conducting material composed of a plurality of conducting particles adjustable relatively to each other, means on one of the members to engage a conductor and means acting upon the conducting material to adjust the particles relative to each other and to the rotatable members.

13. A current collecting device comprising a body member provided with a receptacle having tapered sides, a current collecting member mounted to rotate relative to the body member, anti-friction means interposed between the members, insulating means interposed between the anti-friction means and one of the members and conducting material reposing in the receptacle comprising a plurality of conducting particles adjustable relative to each other and engaging the members.

14. A current collecting device comprising a body member provided with a receptacle having tapered sides, a current collecting member mounted to rotate relative to the body member, anti-friction means interposed between the members, insulating means interposed between the anti-friction means and one of the members and current conducting means reposing in the receptacle and engaging the members.

15. A current collecting device comprising a body member, a current collecting member mounted to rotate relative to the body member about a substantially vertical axis, anti-friction means interposed between the members, insulating means interposed between the anti-friction means and one of the members, a contactor rotating about a horizontal axis mounted on the current collecting member and current conducting means to conduct the current from one member to the other member.

16. A current collecting device comprising a body member provided with a receptacle, a current collecting member movably mounted on the body member and having means extending into and through the receptacle and provided with means to maintain the members together, anti-friction means interposed between the members, insulating means interposed between the anti-friction means and one of the members, current conducting means reposing in the receptacle and composed of a plurality of adjustably disposed conducting particles of conducting material engaging the members and means to maintain the particles in engagement with adjacent particles and with the members.

17. A current collecting device comprising two relative rotatable parts, and interposed conducting material composed of a plurality of conducting particles adjustable relative to each other and means to maintain the particles in engagement with adjacent particles and with the movable parts.

18. A current collector comprising a support member, a body member mounted on the support member, a relative rotatable member mounted on the body member and rotatable about an axis substantially transverse to the axis of the support and carrying means to engage a conductor, and conducting material interposed between the body member and the rotatable member capable of conforming to the shape of the contacting surfaces of the members to electrically connect the members.

19. A current collecting device comprising a body member provided with a receptacle, a member rotatably mounted on the body member to rotate about an axis substantially vertical, antifriction means interposed between the body and rotatable members and adjustable current conducting means reposing in the receptacle and engaging the members.

20. A current collecting device comprising a body member, a current collecting member mounted to rotate relative to the body about a substantially vertical axis, antifriction means interposed between the members, a contactor rotating about a substantially horizontal axis mounted on the current collecting member and current conducting means comprising a plurality of conducting particles interposed between the members to conduct the current from one member to the other member.

21. A current collecting device comprising a body member provided with a receptacle having tapered inner walls, a member mounted on the body member and rotatable relative thereto about a vertical axis and provided with means to engage a source of electrical supply and conducting material reposing in the receptacle and engaging the rotatable members to electrically connect the members.

In testimony whereof I affix my signature.

ELLIS S. LINCOLN.